Patented Dec. 5, 1922.

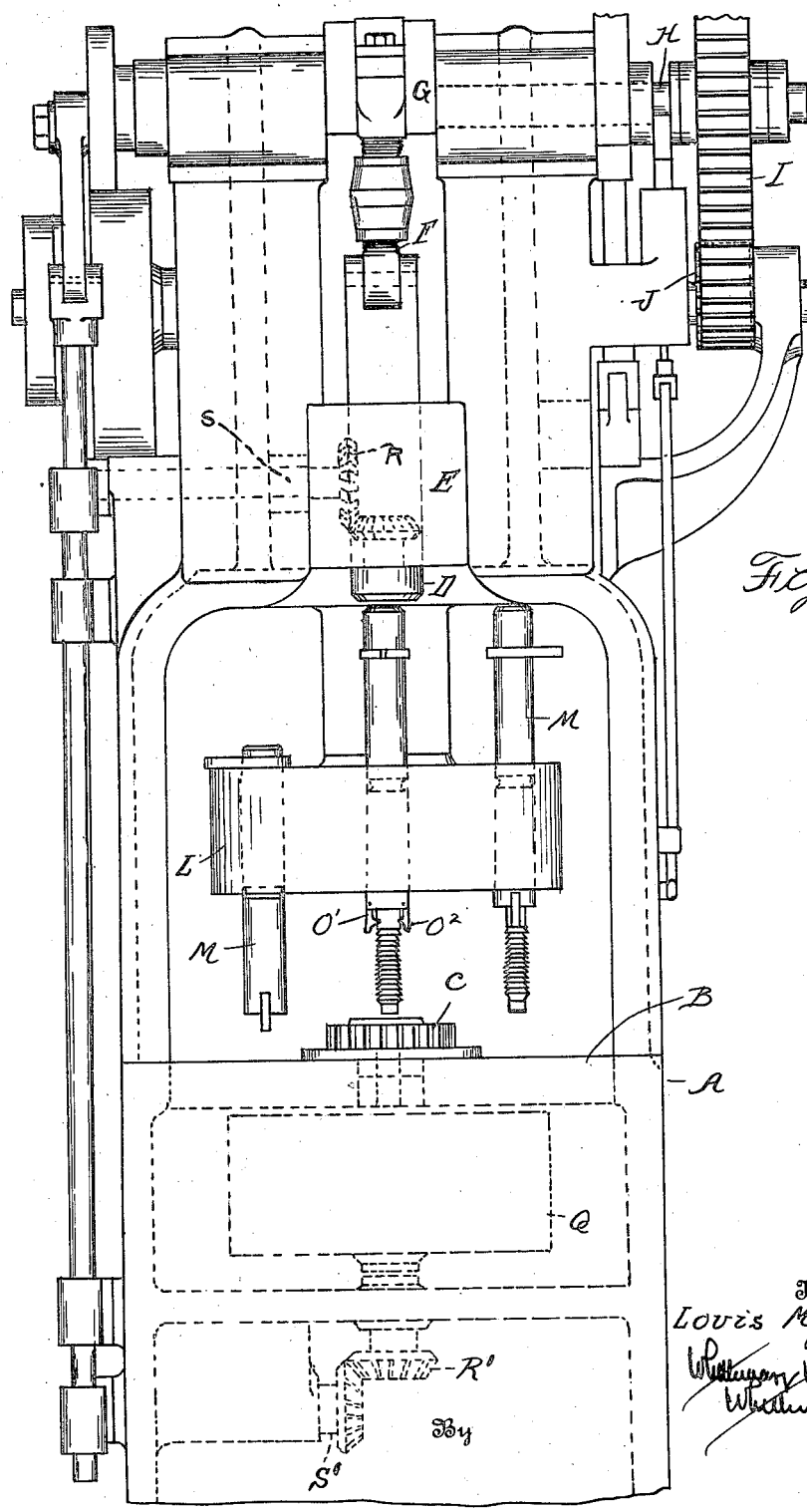

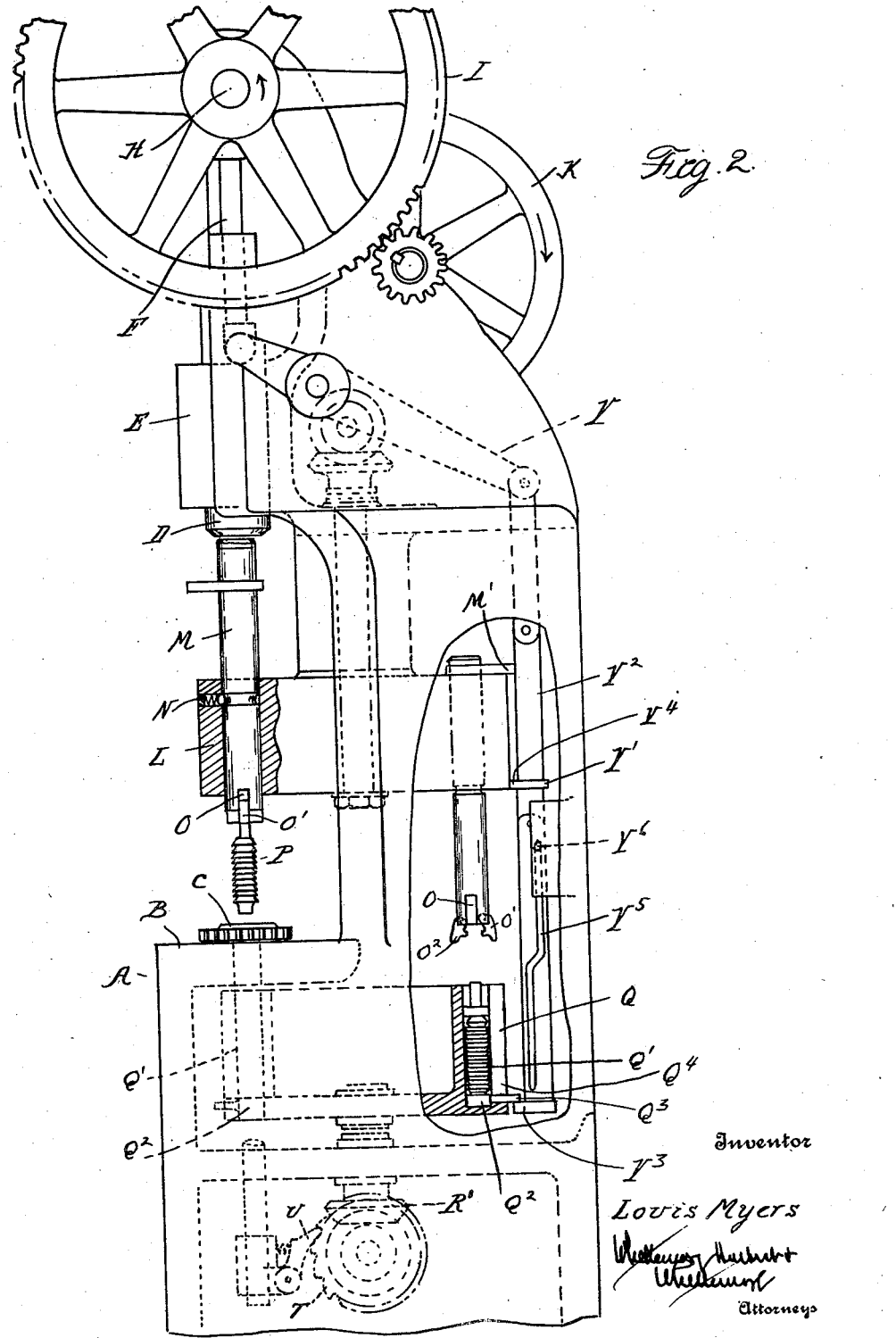

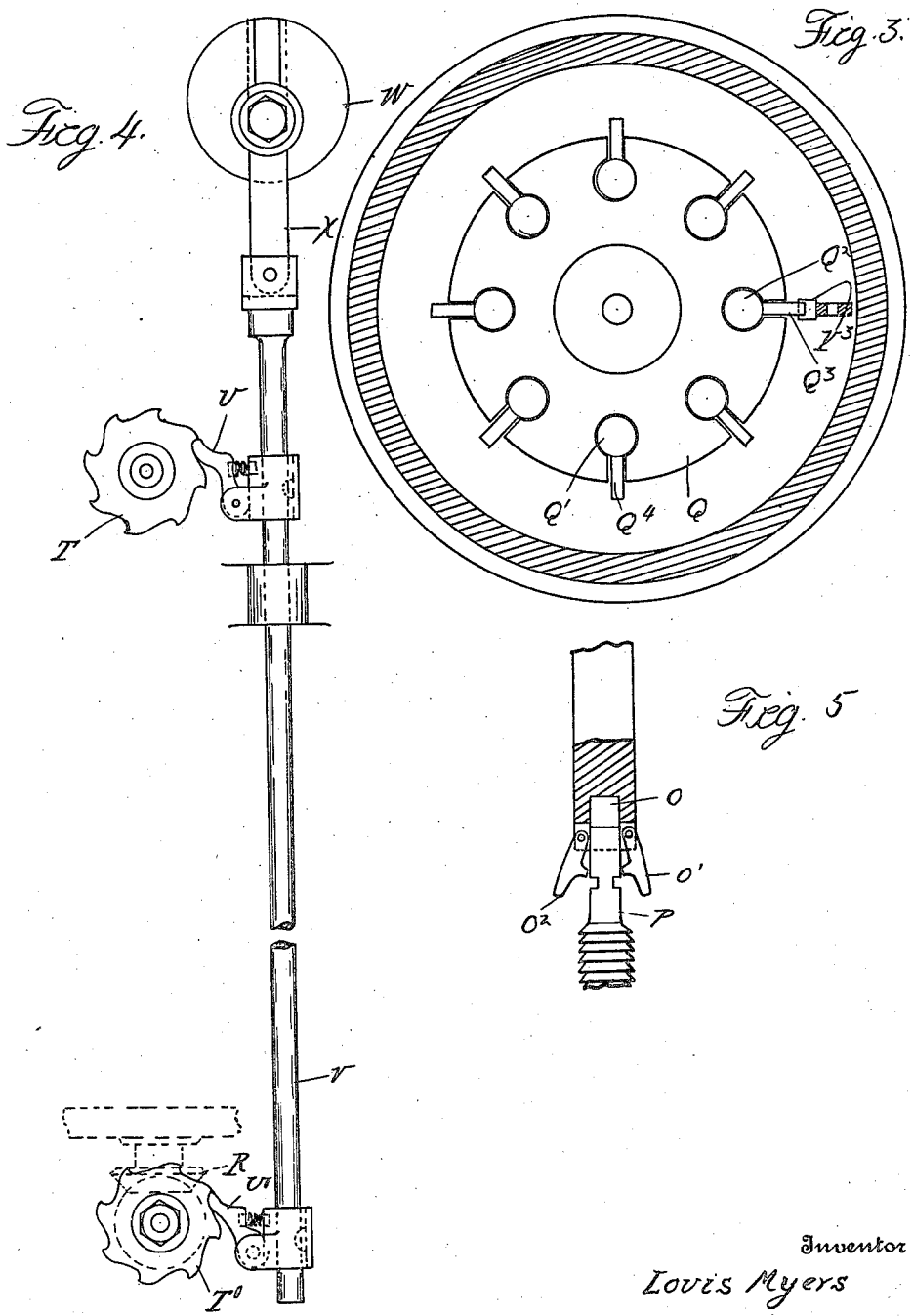

1,437,856

UNITED STATES PATENT OFFICE.

LOUIS MYERS, OF DETROIT, MICHIGAN.

BROACHING MACHINE.

Application filed September 20, 1920. Serial No. 411,614.

*To all whom it may concern:*

Be it known that I, LOUIS MYERS, a citizen of the United States of America, residing at Detroit, in the county of Wayne and State of Michigan, have invented certain new and useful Improvements in Broaching Machines, of which the following is a specification, reference being had therein to the accompanying drawings.

The invention relates to the machining of work by the use of broaches, and it is the object of the invention to obtain a machine in which the entire operation upon the work may be performed in a continuous cycle, and which avoids the use of long broaching tools. To this end the invention consists in the means for automatically manipulating a graduated series of broaching tools to successively present the same in operative relation to the work to force each tool through the work and to maintain the order of the series at the completion of the cycle for a subsequent operation on new work.

In the drawings:

Figure 1 is a front elevation of the machine;

Figure 2 is a side elevation thereof partly in section;

Figure 3 is a plan view;

Figure 4 is an elevation showing the construction of the indexing mechanism;

Figure 5 is a detail of the plunger showing how the catches engage the broach.

A is a suitable frame provided with a table or bed B upon which the work, such as C, may be supported. D is a press plunger arranged above the work table in a portion E of the frame and operated through suitable mechanism such as the pitman rod connection F, the crank G, crank shaft H, gear wheel I, pinion J and drive wheel K, the construction being similar to that of an ordinary punch press.

Mounted above the table B and between the same and the plunger D is a rotary member L. This is provided with a series of plungers M, which by the rotation of said member L may be successively registered with the plunger D and the work C. The plungers M slidably engage guide-ways in the member L and are normally yieldably held in raised position by suitable means such as the spring latch N. At the lower end of each plunger M is a socket or recess O for the reception of a shank of a broaching tool P. The plunger is also provided with a catch member O' for retaining the broach in engagement with its socket. As shown, there is a pair of the catches O' on diametrically opposite sides of the broach and each is provided with a tripping finger O² for releasing the broach at the completion of its passage through the work.

Beneath the table B is a rotary carrier Q having a series of pockets Q' therein corresponding to the series of plungers M and broaches P. The members L and Q are operated in unison and in registration by a suitable mechanism, such as the bevelled gear wheels R and R', connecting each of said members with transversely-extending shafts S and S' having at their outer ends ratchet wheels T and T' operated by pawls U and U' from a reciprocatory rod V actuated by a crank W and pitman rod X from the shaft H. The timing of the mechanism just described is such that after each revolution of the crank shaft H, the ratchet wheels T are operated by the pawls U to be turned one notch, which causes a corresponding rotation of the members L and Q to move one step in the series. The movement is also accomplished during the upward movement of the plunger D, while during the downward movement of said plunger the members L and Q remain stationary.

With the mechanism as thus far described, it will be understood that the broaching tools P, which are carried by the plungers M, are successively forced through the work by the reciprocation of the plunger D. These broaching tools are graduated so that the work is progressively performed thereby throughout the series. Each tool after being forced through the work will be released by the tripping of the fingers O², which disengage the catches O', permitting the tool to drop out of the socket O and into the pocket Q' of the member Q. Each pocket Q' is provided at its lower end with a bottom member Q² having a finger Q³ projecting radially outward through a slot Q⁴. The members Q² will support the tools during the intermittent rotation of the member Q, but at one point in the movement these members are raised to lift the tools into re-engagement with the plungers M. This movement is accomplished by suitable mechanism such as the lever Y, which is connected at one end to the plunger D or other reciprocating part, while the opposite end of said lever is connected through the medium of a link Y' with a vertically reciprocatory member $Y^2$. The member $Y^2$ has at its lower end a finger $Y^3$ which engages with the fingers $Q^3$ of the members $Q^2$ and upon the upward movement of said member $Y^2$ the member $Q^2$ in engagement therewith will lift the tool P, re-engaging it with the plunger M in registration therewith. A further upward movement of the member $Y^2$ will cause the finger $Y^4$ thereon to engage with the finger $M'$ projecting from the plunger M and the plunger is then carried upward until the latch N re-engages to hold it in its raised position. The finger $Y^3$ is disengaged from the finger $Q^3$ after the re-engagement of the tool P with the plunger M, so as to permit the further upward movement of the rod $Y^2$. This disengagement may be accomplished by a rotation of the rod $Y^2$, which is effected by a cam slot $Y^5$ therein engaging a stationary guide pin $Y^6$.

The complete operation of the machine is as follows: The work, such, for instance, as a gear wheel, which is to have a key-way broached therein, is placed upon the table B and held in position by any suitable means (not shown) in proper registration with the actuated broach P. The broaching tools having been engaged with the catches of the plungers M, the mechanism is started. This will cause the reciprocation of the plunger D, forcing downward the registered plunger M and the tool P carried thereby, and pressing the latter completely through the hub of the gear wheel. The tool has a shank of reduced diameter, which will loosely fit the aperture in the hub of the work and therefore when the catches $O'$ are released, the tool will drop by gravity out of the socket O through the work and table B and completely within the pocket $Q'$. During the upward movement of the plunger D, the rod V will be lifted by the crank W and pitman rod X, causing the pawls U to simultaneously turn the ratchet wheels T. This will effect a corresponding rotation of the members L and Q, bringing another plunger M into registration with the plunger D and another tool in registration with the work. Upon the succeeding downward stroke of the plunger D the second plunger M and its tool will be forced downward and these operations will be performed in sequence until the entire series of tools have been forced through the work. During each downward movement of the plunger D the lever Y will be actuated to cause the upward movement of the rod $Y^2$ and this, as previously explained, will lift one of the bottom members $Q^2$ and the tool supported thereby to re-engage the latter with the registering plunger M. Also, after disengagement of the finger $Y^3$ from the finger $Q^2$, the continued upward movement of the member $Y^2$ will lift the plunger M to its original position, where it is locked by the catch N. Thus all of the tools will be successively transferred from the carrier Q to the carrier L, so that at the completion of the cycle, the tools are again in position for a succeeding operation. The operating mechanism may be provided with any suitable trip (not shown), but such as is commonly used upon punch presses for arresting movement at the completion of the cycle, so that the operator may then remove the finished work and insert a new blank for a succeeding operation.

Some of the advantages of my machine are; first, that in place of long broaching tools, which are expensive to make and easily broken, there is substituted a series of short tools, which are cheaper and stronger; second, the work can be performed more expeditiously with my improved construction than with constructions heretofore used; and third, the mechanism is more compact and the space required less than where long broaching tools are used.

What I claim as my invention is:

1. A broaching machine or the like, comprising a series of graduated broaching tools, means for successively registering said tools with the work, means operating on each tool while in registration with the work for forcing the same through the work, and means for returning the used tools through a different path to re-establish the original series.

2. A broaching machine or the like, comprising a series of graduated broaching tools, a work holder, a pair of carriers for the tools arranged on opposite sides of the work in said holder, means for intermittently moving said carriers to successively register the tools carried thereby with the work, means for forcing the tool in registration with the work from one carrier through the work into engagement with the other carrier, and means for returning said tool from the second carrier to the first carrier when in position out of registration with the work.

3. A broaching machine or the like, comprising a series of graduated broaching tools, a carrier for said tools, a work holder, means for intermittently operating said carrier to successively register the tools with the work, a reciprocating plunger for forcing the registered tool through the work, a carrier for receiving the tool after passage through the work, and means operating out of registration with the work for transferring the tool from the second carrier back to the original carrier.

4. A broaching machine or the like, comprising a work holder, an endless carrier arranged at one side of said work holder, a series of broaching tools engaged with said carrier and successively registered thereby with the work, a plunger in registration with the tool, which is in registration with the work, for forcing said tool through the work, a carrier for receiving the tool, means for operating said carriers in unison, and transferring means for returning the tool from the second carrier to the first when out of registration with the work.

5. In a broaching machine or the like, the combination with a work-supporting bed or table, of a rotary carrier arranged thereabove, a series of reciprocatory plungers mounted in said carrier and successively registered thereby with the work, an actuating plunger in operative relation to the plunger of the series which is in registration with the work, a series of graduated broaching tools respectively detachably engaged with the plungers of the series, means for intermittently depressing the actuating plunger to force the tool carried by the registering plunger through the work, means for releasing said tool from its carrying plunger at the completion of its operation, a carrier beneath the work into which the tool is dropped when released, and means operating upon said tool when out of registration with the work for returning the same from the second carrier to the first and for re-engaging it with the plunger.

6. In a broaching machine or the like, the combination with a work holder, of a series of graduated broaching tools, reciprocatory plungers with which said tools are respectively detachably engaged, a carrier for said reciprocatory plungers, means for intermittently actuating said carrier to register the plungers and tools thereof with the work, an actuating plunger for operative relation to the plunger in registration with the work, means for depressing said actuating plunger to force the tool through the work, and releasing means automatically operated at the completion of the movement, permitting said tool to disengage from the plunger and pass completely through the work.

7. In a broaching machine or the like, the combination of a work holder, a series of graduated broaching tools, reciprocatory plungers having sockets for the reception of the respective tools, a carrier for said plungers, means for intermittently actuating said carrier to successively register the plungers thereof and the tools carried thereby with the work, a catch for retaining each tool in its plunger, an actuating plunger in operative relation to the plunger which is in registration with the work, and means for depressing said actuating plunger to force the tool through the work, and means for releasing the catch at the completion of this movement, a carrier for receiving the tool released from the plunger, and means operating out of registration with the work for returning the tool from the second carrier into re-engagement with the socket and catch of the plunger in the first carrier.

8. In a broaching machine or the like, the combination with a reciprocatory plunger, of a work holder in alignment therewith, a tool carried by said plunger having a cutting portion and a shank portion providing a clearance, means for actuating said plunger to force the cutting portion of said tool completely through the work, and means for releasing the tool from said plunger to permit the shank portion to drop through the work.

9. In a broaching machine or the like, the combination with a reciprocatory plunger, of a work holder in alignment therewith, a broaching tool carried by said plunger and having a cutting portion and a shank portion providing a clearance, means for actuating said plunger to force the cutting portion of the tool completely through the work, means for automatically releasing the tool from the plunger to permit the shank portion to fall through the work, and a receptacle beneath the work for receiving the released tool.

10. In a broaching machine or the like, the combination with a reciprocatory plunger, of a work holder in alignment therewith, a broaching tool carried by said plunger having a cutting portion and a shank portion providing a clearance, a catch for holding said tool in engagement with the plunger, means for depressing the plunger to force the cutting portion of the tool completely through the work, and a trip for releasing said catch on the completion of the movement of the cutting portion of said tool through the work to permit the shank portion thereof to drop through the work.

11. In a broaching machine or the like, the combination with a reciprocatory plunger, of a work holder in alignment therewith, a broaching tool having a cutting portion and a shank portion providing a clearance, a socket in said plunger for receiving the end of the shank portion of said tool, a catch for retaining the tool in said socket, means for depressing the plunger to force the cutting portion of the tool completely through the work, a trip for releasing said catch at the completion of said movement to permit the shank portion of the tool to disengage from said plunger and drop through the work, and a receptacle beneath the work holder for receiving the tool.

12. In a broaching machine or the like, the combination with a work holder, of a pair of carriers arranged on opposite sides thereof, a series of plungers mounted in one of said carriers and adapted to be successively registered with said work holder, a series of pockets in the second carrier in registration with the plungers of said first carrier, a broaching tool for each plunger having a cutting portion and a shank portion providing a clearance, means for intermittently moving said carriers in registration to successively register the plungers and pockets with said work holder, means operating upon the plunger in alignment with the work holder for depressing the same and forcing the cutting portion of the tool through the work, a catch for retaining the tool in engagement with the plunger adapted to be released upon the depression of the plunger permitting the shank portion of the tool to drop through the work and into the pocket of the second carrier, and means out of registration with the work for transferring the tool from the pocket of the second carrier into re-engagement with the corresponding plunger of the first carrier.

13. In a broaching machine or the like, the combination with a work holder, of a rotary carrier arranged thereabove, a series of reciprocatory plungers mounted in said carrier and adapted to be successively registered with the work, a yieldable catch for holding said plungers in raised position, a broaching tool for each plunger having a cutting portion and a shank portion providing a clearance, means for depressing each plunger while in registration with the work to force the cutting portion of the tool completely through the work, a catch for retaining the tool in the plunger adapted to be released on the depression of said plunger, a carrier beneath said work holder actuated in registration with said first-mentioned carrier and having a series of pockets which are successively registered with the work and into which the tools drop when released from their plungers, a movable bottom member in each pocket, and means operating on said bottom member when the pocket is out of registration with the work for raising the same and re-engaging the tool with the plunger, and means for raising the plunger with the tool in engagement therewith into its initial position and into engagement with the catch.

14. In a broaching machine or the like, the combination with a plunger, of a work holder in alignment therewith, a broaching tool detachably secured to said plunger and having a cutting portion and a notched shank portion, means for actuating said plunger to force the cutting portion of the tool through the work, and means engageable with said notched shank for releasing the tool from the plunger after the cutting operation to permit the same to fall through the work.

In testimony whereof I affix my signature.

LOUIS MYERS.